United States Patent
Furukawa et al.

(10) Patent No.: US 6,802,185 B2
(45) Date of Patent: Oct. 12, 2004

(54) CONTROL DEVICE FOR MOTOR FAN OF VEHICLE

(75) Inventors: Tomofumi Furukawa, Isehara (JP); Hiromi Murao, Atsugi (JP); Kazuhira Kobayashi, Ebina (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/602,683

(22) Filed: Jun. 25, 2003

(65) Prior Publication Data

US 2004/0016246 A1 Jan. 29, 2004

(30) Foreign Application Priority Data

Jun. 25, 2002 (JP) .................................... 2002-184709
Aug. 30, 2002 (JP) .................................... 2002-254431

(51) Int. Cl.[7] ............................................. F25D 17/06
(52) U.S. Cl. ........................ 62/89; 62/181; 62/183; 123/41.12
(58) Field of Search ........................ 62/181, 183, 184, 62/507, 89; 123/41.12

(56) References Cited

U.S. PATENT DOCUMENTS

| | | | | |
|---|---|---|---|---|
| 4,590,772 A | * | 5/1986 | Nose et al. ............. | 62/184 |
| 4,651,922 A | * | 3/1987 | Noba ..................... | 236/35 |
| 4,658,595 A | * | 4/1987 | Shimada et al. ........ | 62/179 |
| 5,014,519 A | * | 5/1991 | Noji et al. .............. | 62/176.3 |
| 5,072,597 A | * | 12/1991 | Bromley et al. ........ | 62/209 |
| 5,099,654 A | * | 3/1992 | Baruschke et al. ..... | 62/180 |
| 5,623,835 A | * | 4/1997 | Layman et al. ......... | 62/133 |
| 5,799,867 A | * | 9/1998 | Misawa .................. | 237/2 B |
| 6,199,398 B1 | * | 3/2001 | Takeuchi et al. ....... | 62/323.1 |
| 6,526,771 B2 | * | 3/2003 | Takano et al. .......... | 62/228.3 |
| 2002/0026801 A1 | | 3/2002 | Yamashita | |

FOREIGN PATENT DOCUMENTS

| | | |
|---|---|---|
| DE | 197 43 828 A1 | 4/1999 |
| DE | 101 30 181 A1 | 2/2002 |
| EP | 0455910 A2 * | 11/1991 |
| EP | 1 154 132 A2 | 11/2001 |
| EP | 1 348 584 A1 | 10/2003 |
| JP | 403104732 A * | 5/1991 |
| JP | 2000-274243 A | 10/2000 |
| JP | 2001-317353 A | 11/2001 |

* cited by examiner

Primary Examiner—William E. Tapolcai
Assistant Examiner—Mohammad M. Ali
(74) Attorney, Agent, or Firm—Foley & Lardner LLP

(57) ABSTRACT

A control device for a motor fan of a vehicle, which controls the motor fan to cool a radiator for engine coolant and a condenser for air conditioner refrigerant, includes: a first command value calculation section which calculates a first command value for control of the motor fan according to refrigerant pressure; a second command value calculation section which calculates a second command value for control of the motor fan according to coolant temperature; a first target value setting section which sets the greater of the first command value and the second command value as a first target value; a second target value setting section which obtains a second target value for control of the motor fan which corresponds to a total torque which is smaller than a total torque of a torque of an alternator and a torque of a compressor corresponding to the first target value; and a control section which controls the motor fan according to the second target value. And the second target value setting section corrects the total torque of the torque of the alternator and the torque of the compressor based upon a predetermined condition when obtaining the total torque of the torque of the alternator and the torque of the compressor.

18 Claims, 14 Drawing Sheets

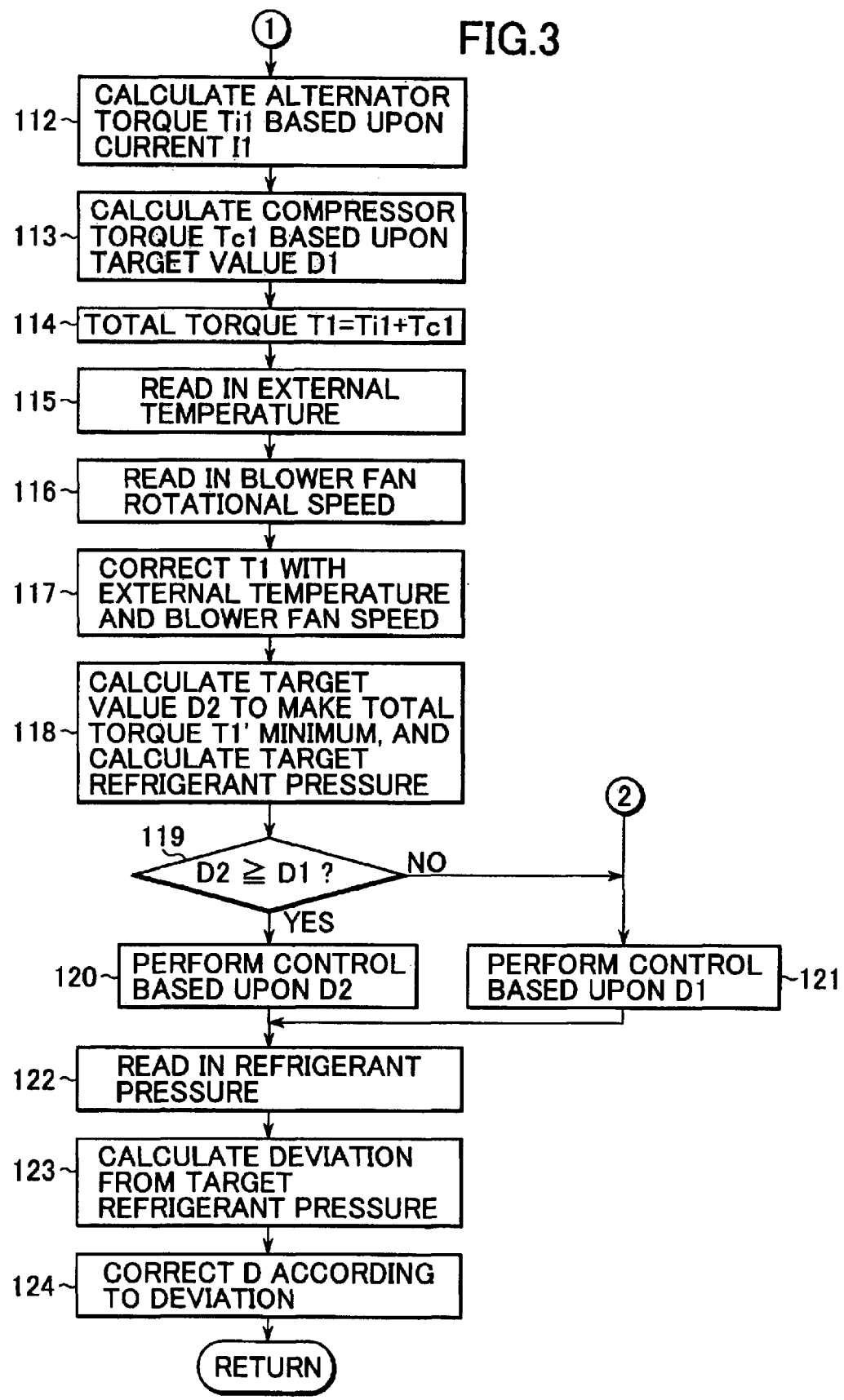

US 6,802,185 B2

CONTROL DEVICE FOR MOTOR FAN OF VEHICLE

BACKGROUND OF THE INVENTION

1. Field of the Invention

The present invention relates to a control device for a motor fan of a vehicle which cools a condenser for an air conditioner or the like.

2. Description of the Related Art

As a control technology for a motor fan of a vehicle, there is, for example, the one disclosed in Japanese Laid-Open Patent Publication No. 2001-317353.

With this control technology, the greater one of a first duty command value for the motor fan which fulfils the performance requirements for the air conditioning system, and a second duty command value for the motor fan which fulfils the requirements of the engine cooling system, is set first as a first duty target value. And then a second duty target value for the motor fan is calculated which makes the total torque, which is the sum of the torque of the alternator and the torque of the compressor of the air conditioner, become a minimum. And the motor fan is controlled according to that one of the first and the second duty target values which is the larger as a control command values for the motor fan, and thereby, along with maintaining the required performance of the engine cooling system and of the air conditioning system, the fuel economy of the vehicle is improved.

With the above described prior art, the calculation of the torque of the compressor for the second duty target value is performed based upon the pressure of the air conditioner refrigerant and upon the external temperature. Due to this, it is possible to calculate the second duty target value in correspondence to the refrigerant pressure and the external temperature, and it becomes possible to improve the fuel economy, without it being influenced by change of the refrigerant pressure or of the external temperature.

SUMMARY OF THE INVENTION

However, since the actual torque of the compressor also varies according to the cooling requirement within the vehicle passenger compartment. Accordingly, the torque of the compressor which has only been calculated from the external temperature and the refrigerant pressure as described above will deviate from the actual torque, if the cooling requirement within the vehicle passenger compartment has changed.

Since, due to this, the second duty target value which has been calculated does not necessarily correspond to the minimum torque, so that the engine does not necessarily drive the motor fan and the compressor at the minimum load, accordingly, the possibility of improving the fuel economy of the vehicle experiences a certain restriction.

The present invention proposes a control device of a motor fan of a vehicle which anticipates enhancement of the fuel economy and also makes possible for the compressor to operate in the ideal state.

A control device for a motor fan of a vehicle, according to the present invention, which controls the motor fan to cool a radiator for engine coolant and a condenser for air conditioner refrigerant, comprises: a first command value calculation section which calculates a first command value for control of the motor fan according to refrigerant pressure; a second command value calculation section which calculates a second command value for control of the motor fan according to coolant temperature; a first target value setting section which sets the greater of the first command value and the second command value as a first target value; a second target value setting section which obtains a second target value for control of the motor fan which corresponds to a total torque which is smaller than a total torque of a torque of an alternator and a torque of a compressor corresponding to the first target value; and a control section which controls the motor fan according to the second target value. And the second target value setting section corrects the total torque of the torque of the alternator and the torque of the compressor based upon a predetermined condition when obtaining the total torque of the torque of the alternator and the torque of the compressor.

Another control device for a motor fan of a vehicle, according to the present invention, which controls a motor fan by duty ratio control to cool a radiator for engine coolant and a condenser for air conditioner refrigerant, comprises: a first command value calculation section which calculates a first command value of duty ratio according to refrigerant pressure; a second command value calculation section which calculates a second command value of duty ratio according to coolant temperature; a first target value setting section which sets the greater of the first command value and the second command value as a first target value of duty ratio; a second target value setting section which calculates a total torque of a torque of an alternator and a torque of a compressor, and sets a duty ratio for which the total torque becomes a minimum as a second target value; and a duty ratio determination section which sets the greater of the first target value and the second target value as a final duty ratio. And the second target value setting section corrects the calculated total torque of the torque of the alternator and the torque of the compressor based upon a rotational speed of a blower fan motor, and sets a duty ratio for which the corrected total torque becomes minimum as the second target value.

Another control device for a motor fan of a vehicle, according to the present invention comprises: an engine; an alternator which is driven by the engine; an air conditioning device of which a compressor is driven by the engine; an electrically driven motor fan which is operated by receiving supply of electrical power generated by the alternator, and which cools the air conditioning device; a discharge pressure detection section which detects a discharge pressure of the compressor; a target discharge pressure setting section which sets a target discharge pressure of the compressor with respect to a cooling performance which is required from the air conditioning device, so that a total of a drive load of the compressor and a drive load of the alternator for obtaining electrical power for operating the electrically driven motor fan becomes a minimum; and a motor fan control section which controls an operation of the electrically driven motor fan so that the discharge pressure of the compressor becomes equal to the target discharge pressure.

A control method for a motor fan of a vehicle, according to the present invention, which controls the motor fan to cool a radiator for engine coolant and a condenser for air conditioner refrigerant, comprises: calculating a first command value for control of the motor fan according to refrigerant pressure; calculating a second command value for control of the motor fan according to coolant temperature; setting the greater of the first command value and the second command value as a first target value; obtaining a second target value for control of the motor fan which corresponds to a total torque which is smaller than a total torque of a torque of an alternator and a torque of a compressor corresponding to the first target value; and controlling the motor fan according to the second target value. And the total torque of the torque of the alternator and the torque of the compressor is corrected based upon a predetermined condition when obtaining the total torque of the torque of the alternator and the torque of the compressor.

Another control method for a motor fan of a vehicle, according to the present invention, which controls the motor fan to cool an air conditioning device of which a compressor is driven by an engine, comprises: detecting a discharge pressure of the compressor; setting a target discharge pressure of the compressor with respect to a cooling performance which is required from the air conditioning device, so that a total of a drive load of the compressor and a drive load of the alternator for obtaining electrical power for operating the motor fan becomes a minimum; and controlling an operation of the motor fan so that the discharge pressure of the compressor becomes equal to the target discharge pressure.

BRIEF DESCRIPTION OF THE DRAWINGS

FIG. 3 is a flow chart continuing on from FIG. 2, showing the further flow of control of a motor fan.

FIG. 15 is a flow chart showing the details of control of the electrically driven cooling fan when the air conditioner is ON.

DESCRIPTION OF THE PREFERRED EMBODIMENTS

First Embodiment

Next, the preferred first embodiment of the present invention will be explained.

Figure 1:
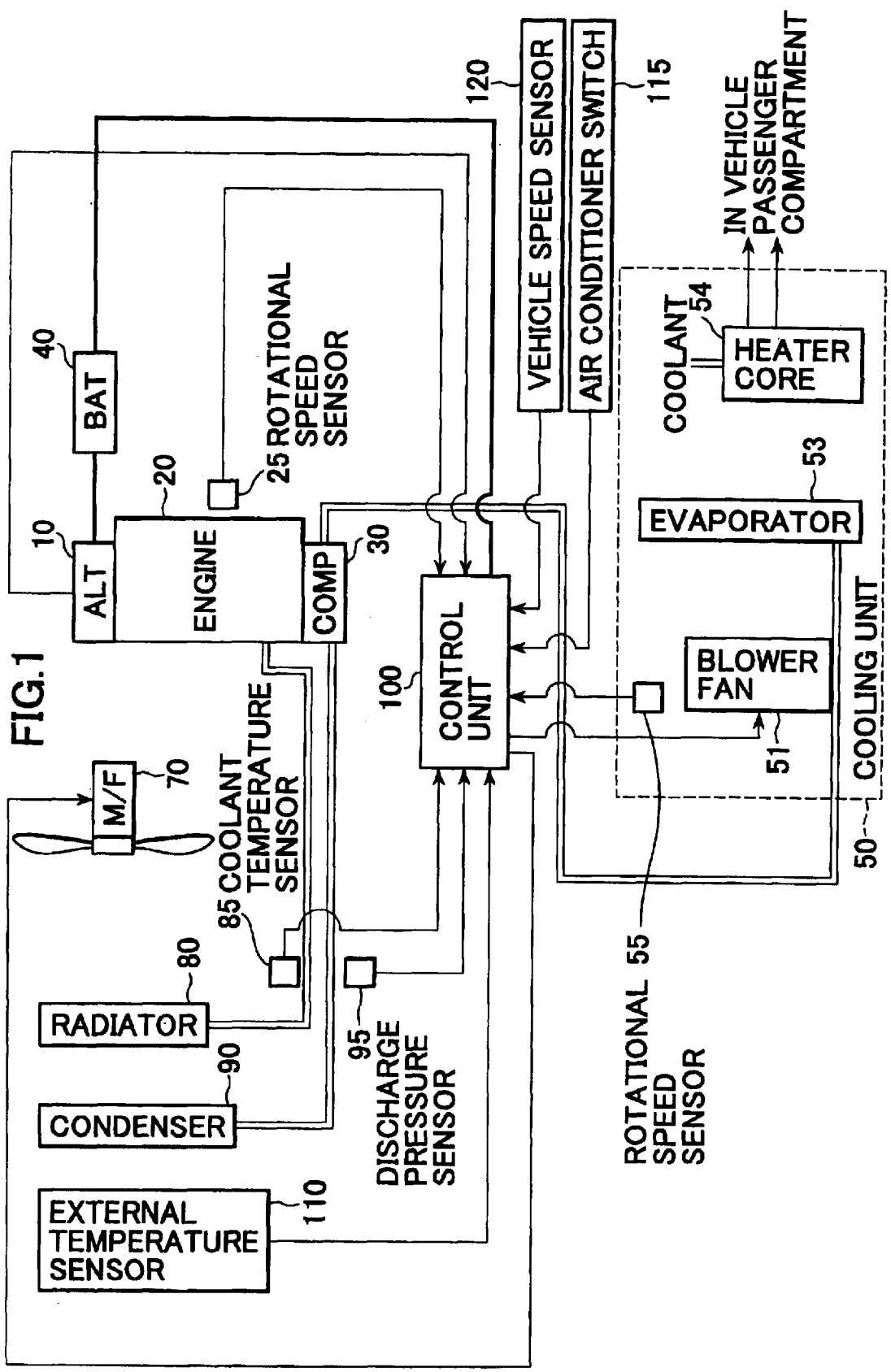
FIG. 1 is a figure showing a cooling system for a vehicle to which the present invention is applied.

FIG. 1 is a figure showing a cooling system for a vehicle of the preferred embodiment to which the present invention is applied. To a control unit 100 there are connected a rotational speed sensor 25 which detects the rotational speed (revolutions per minute) of the engine 20 of the vehicle, a coolant temperature sensor 85 which detects the temperature of the coolant of the engine 20, a discharge pressure sensor 95 which detects the pressure of the refrigerant which is flowing in a condenser 90 of an air conditioning system, and an external temperature sensor 110.

The coolant of the engine 20 is cooled by a radiator 80 which is disposed in the engine room.

The condenser 90 and a radiator 80 are disposed as overlapped in the longitudinal direction (the front and the rear direction) of the vehicle, and a motor fan 70 is disposed behind them, so that the condenser 90 and the radiator 80 are cooled by a current of external air created by the motion of the vehicle and by the action of the motor fan 70. The external temperature sensor 110 is arranged in the path of the air as it comes in to the condenser 90 and so on.

The engine 20 is connected or linked to a alternator (ALT) and to the compressor of an air conditioning system (COMP), and refrigerant which has been compressed by the compressor 30 absorbs heat within an evaporator 53 of a cooling unit 50 which is disposed within the passenger compartment of the vehicle, and discharges heat at the condenser 90.

The alternator 10 is connected to a battery (BAT) 40 and to the control unit 100, and supplies them with operating electrical power. When the engine 20 is stopped, the battery 40 supplies operating electrical power to the control unit 100.

During engine cooling, the coolant for the engine is circulated through the heater core 54 of the cooling unit 50.

A blower fan 51 is provided to the heater core 54 and the evaporator 53, so as to blow air whose temperature has been regulated into the passenger compartment of the vehicle.

A rotational speed sensor 55 which detects the rotational speed of the blower fan 51, a switch for the air conditioning system (an air conditioner switch) 115, and a vehicle speed sensor 120 are connected to the control unit 100.

Next, the flow of a control procedure for the motor fan which is executed by the control unit 100 will be explained.

Figure 2:
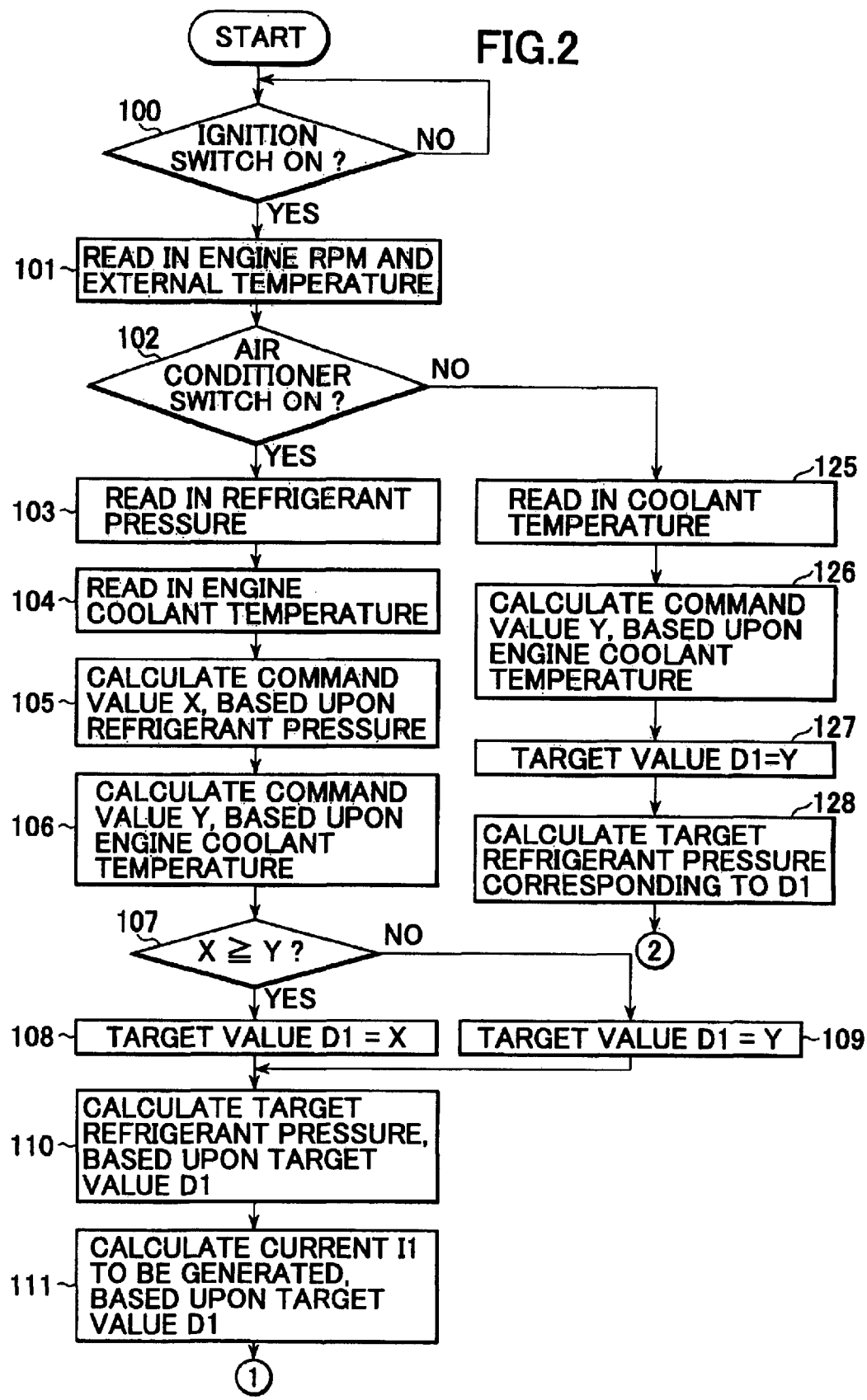
FIG. 2 is a flow chart showing the flow of control of a motor fan.

FIGS. 2 and 3 are flow charts showing this motor fan control procedure flow.

In a first step 100, it is detected whether or not an ignition switch not shown in the figures is turned ON and the engine has been started, and then the flow of control continues to the step 101.

In this step 101, the value of the engine rotational speed as detected by the rotational speed sensor 25 and the value of the external temperature as detected by the external temperature sensor 110 are read in.

In the next step 102 it is checked whether the air conditioner switch 115 is ON or OFF, and if it is ON then the flow of control proceeds to the next step 103, while if it is OFF then the flow of control is transferred to the step 125.

In the step 103 the value of the pressure of the air conditioner refrigerant as detected by the discharge pressure sensor 95 is read in.

In the next step 104 the value of the temperature of the coolant of the engine as detected by the coolant temperature sensor 85 is read in.

Figure 4A:
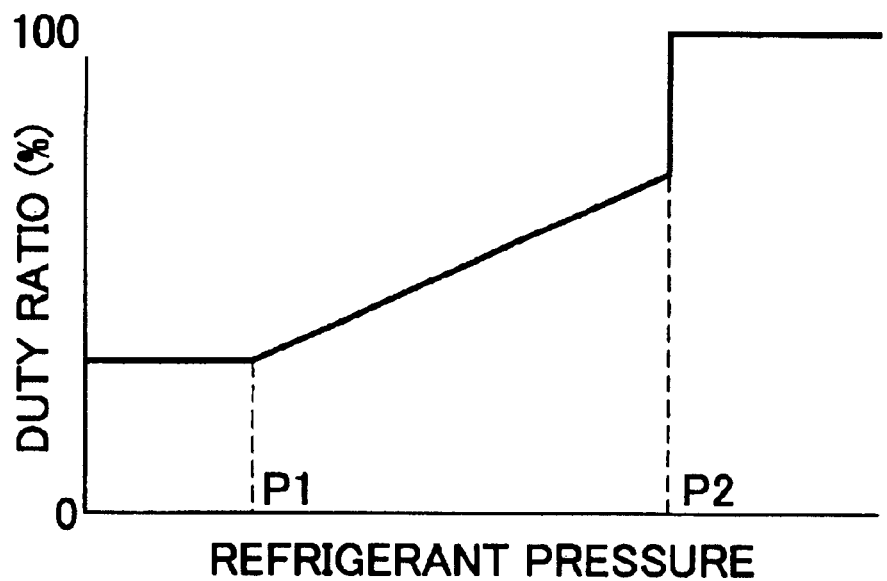
FIG. 4A is a map showing the relationship between refrigerant pressure and the duty ratio of the motor fan.

In the next step 105, a first command value X for the duty ratio of the motor fan for satisfying a requirement for performance of the air conditioner is calculated from the refrigerant pressure which was read in in the step 103, by using the map giving the relationship between the refrigerant pressure and the duty ratio of the motor fan shown in FIG. 4A. The characteristic shown in the map in FIG. 4A is that the duty ratio is set to a constant value of about 30% when the refrigerant pressure is below a value P1, while it rises linearly with respect to the refrigerant pressure when the refrigerant pressure is between P1 and P2; and the duty ratio is kept at a constant value of 100% when the refrigerant pressure is above P2.

Figure 4B:
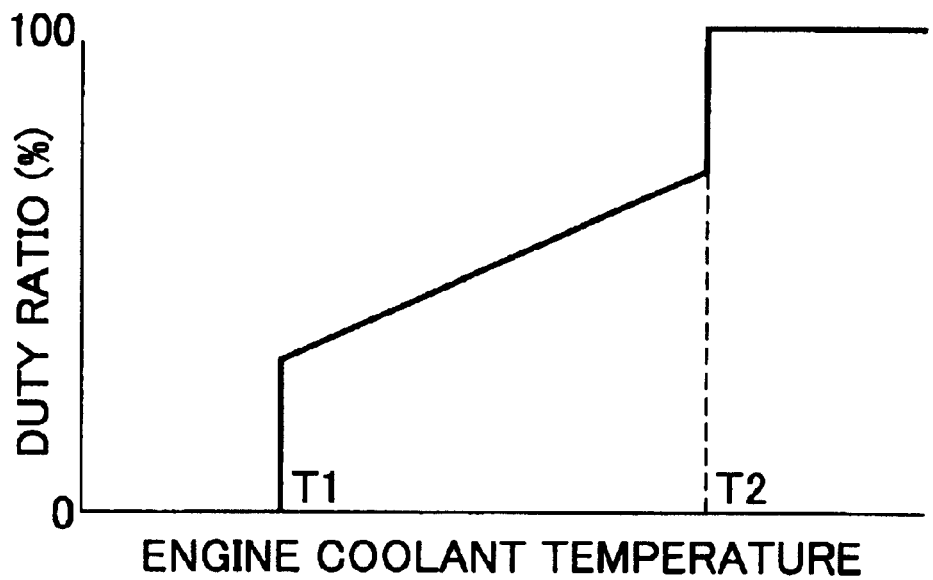
FIG. 4B is a map showing the relationship between coolant temperature and the duty ratio of the motor fan.

In the next step 106, a second command value Y for the duty ratio of the motor fan for satisfying a requirement for engine cooling is calculated from the engine coolant temperature which was read in in the step 104, by using the map giving the relationship between the engine coolant temperature and the duty ratio of the motor fan shown in FIG. 4B. The characteristic shown in the map in FIG. 4B is that the duty ratio is set to 0% (so that the motor fan is not driven) when the coolant temperature is below a value T1, while it rises linearly with respect to the coolant temperature when the coolant temperature is between T1 and T2; and the duty ratio is kept at a constant value of 100% when the coolant temperature is above T2.

In the next step 107, the above described first duty ratio command value X and second duty ratio command value Y are compared together. And the flow of control proceeds to the next step 108 if the first command value X is greater than or equal to the second command value Y, while it is transferred to the step 109 if the first command value X is less than the second command value Y.

In the step 108, the first command value X is taken as a first target value D1 for the duty ratio of the motor fan.

In the step 109, the second command value Y is taken as a first target value D1 for the duty ratio of the motor fan.

By doing this, the maximum one of the first command value X and the second command value Y is employed as the first target value D1, so that it is possible to satisfy both requirements for engine cooling and also requirements for performance of the air conditioning system.

Figure 5:
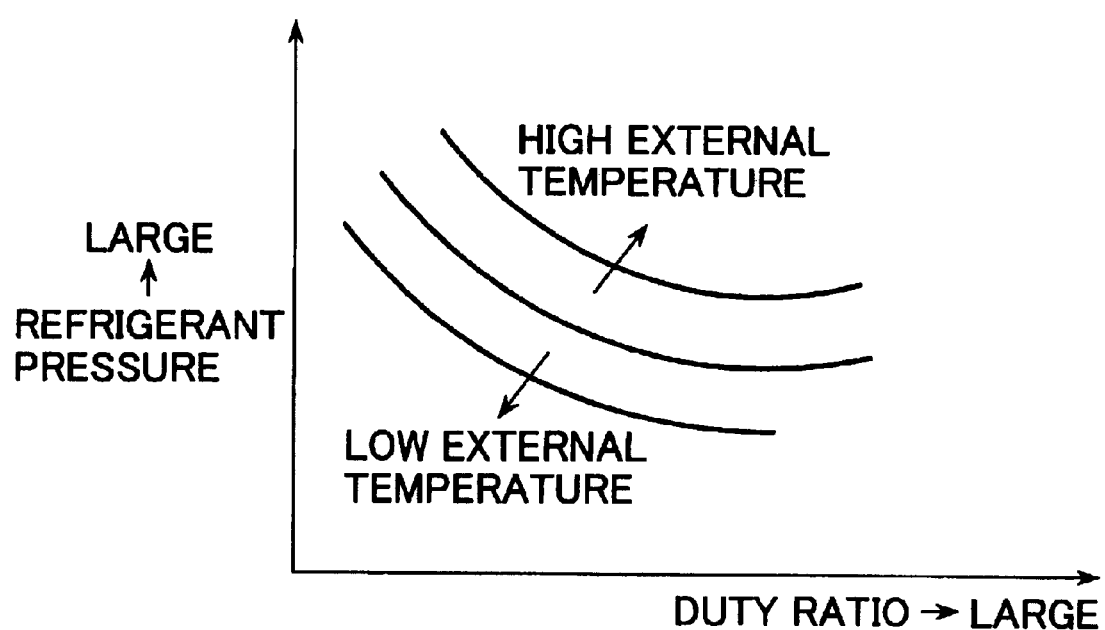
FIG. 5 is a map showing the relationship between the duty ratio and the refrigerant pressure, and the external temperature.

In the next step 110, based upon the first target value D1 for the duty ratio and upon the external temperature which was read in in the step 101, a target refrigerant pressure for the compressor which is considered ideal is calculated, using the map of refrigerant pressure shown in FIG. 5.

In the map of FIG. 5, the relationship between the duty ratio, the refrigerant pressure, and the external temperature is determined, and this relationship exhibits the characteristics that the refrigerant pressure is low when the duty ratio becomes high, while the refrigerant pressure becomes high when the external temperature becomes high. The meaning of this is that, when the duty ratio of the motor fan becomes high, the amount of draft produced by the motor fan becomes great, and the cooling performance of the condenser is relatively enhanced, so that the pressure of the refrigerant which is expelled by the compressor may be reduced without problem. Furthermore, when the external temperature becomes high, the cooling performance is deteriorated in accordance therewith, so that it is necessary to compensate for this deterioration or correct this deterioration.

Figure 6:
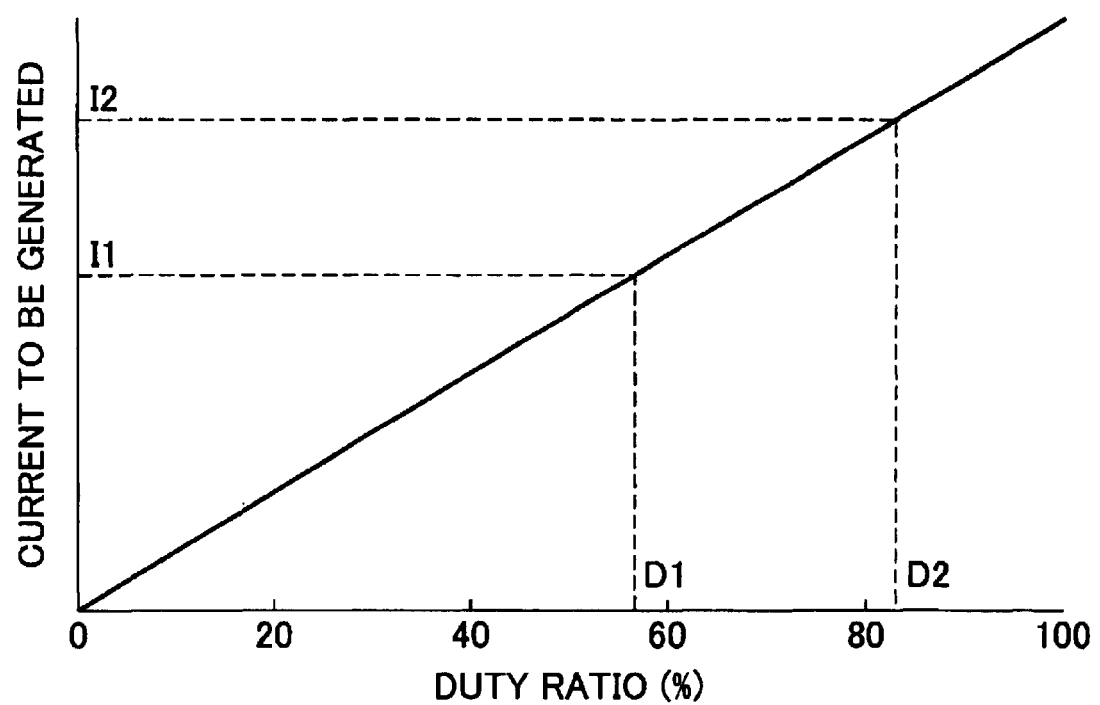
FIG. 6 is a map showing the relationship between the duty ratio of the motor fan and the electric current generated by the alternator.

In the next step 111, the amount I1 of electric current to be generated by the alternator is calculated from the first target value D1, using the map which gives the relationship between the duty ratio of the motor fan and the amount of electric current of the alternator shown in FIG. 6. The map of FIG. 6 shows the characteristic in which according to the magnitude of the duty ratio, the magnitude of the electric current which is required to generate in order to drive the motor fan at this duty ratio becomes greater.

Figure 7:
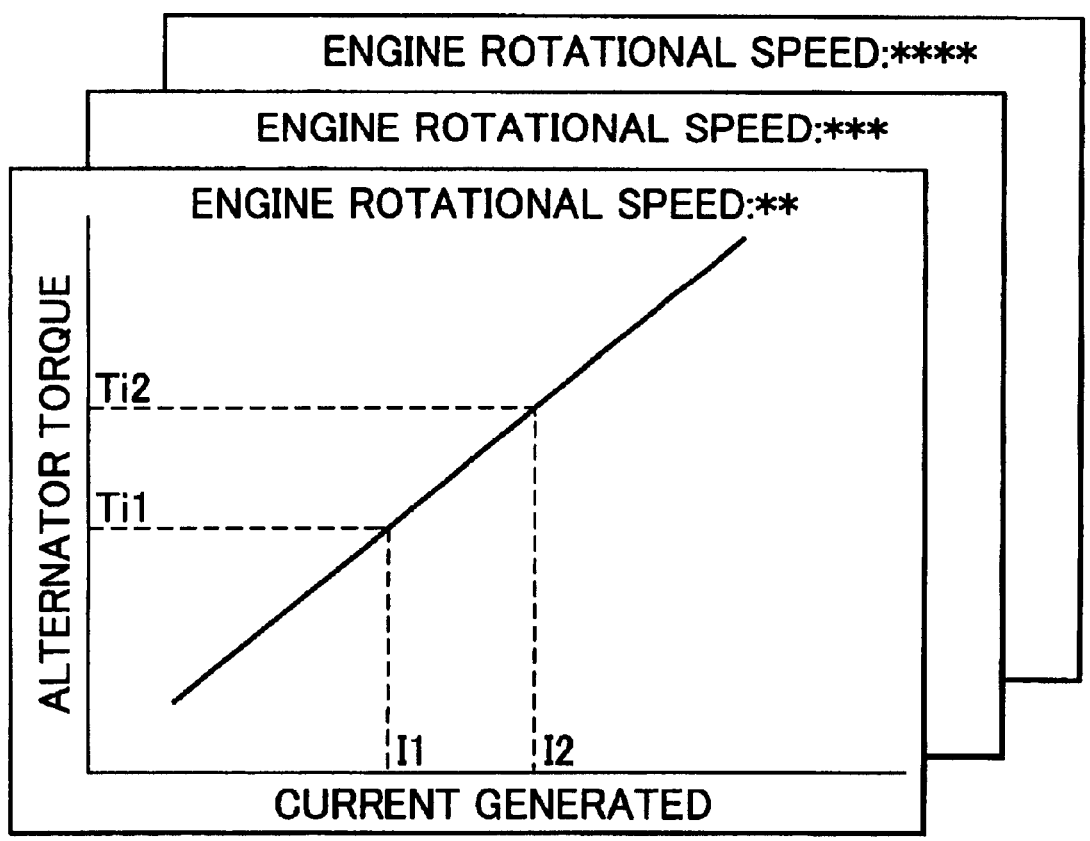
FIG. 7 is a map showing the relationship between the electric current generated by the alternator and torque.

In the next step 112 in FIG. 3, the torque Ti1 of the alternator is calculated from the electric current I1 which is to be generated and the engine rotational speed, using the map giving the relationship between the electric current generated by the alternator and torque shown in FIG. 7. The map of FIG. 7 shows the characteristic in which at one particular engine rotational speed (in other words, at one particular alternator rotational speed), according to the magnitude of the electric current generated by the alternator, the torque which is required to generate this electric current becomes greater. A map of this type is provided for each value of the engine rotational speed.

Figure 8:
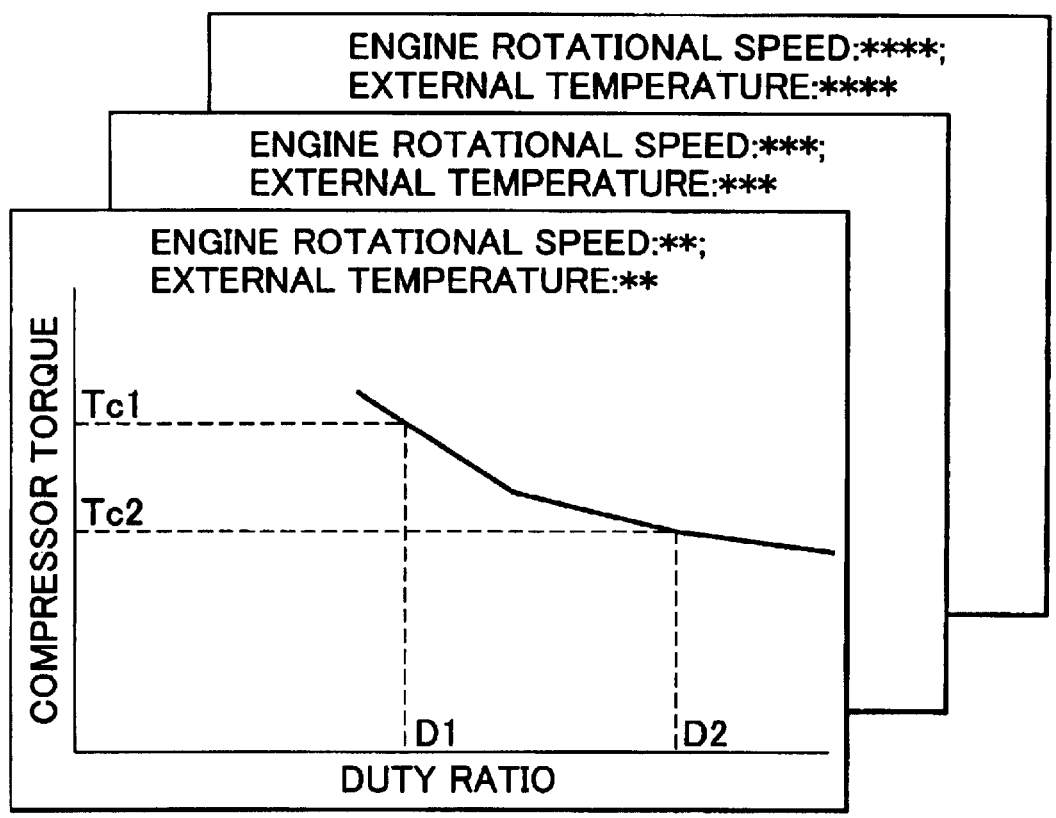
FIG. 8 is a map showing the relationship between the duty ratio of the motor fan and the torque of the compressor.

In the next step 113, the compressor torque Tc1 is calculated from the first target value D1, using the map giving the relationship between the duty ratio of the motor fan and the torque of the compressor shown in FIG. 8. The map of FIG. 8 shows the characteristic in which at one particular engine rotational speed (in other words, at one particular compressor rotational speed) and at one particular value of external temperature, the relationship between the duty ratio of the motor fan and the torque of the compressor when the condenser is being cooled by the motor fan which is being driven at this duty ratio is defined, and in which the required torque diminishes as the duty ratio becomes greater. A map of this type is provided for each combination of values of the engine rotational speed and the external temperature.

In the next step 114, the total torque T1 is calculated by adding together the torque Ti1 of the alternator and the torque Tc1 of the compressor.

In the next step 115, the value of the external temperature detected by the external temperature sensor 110 is read in.

Although the value detected for the external temperature has already been read in in the step 101, accuracy is improved by reading it in again in this step for a second time.

In the next step 116, the rotational speed of the blower fan is read in from the rotational speed sensor 55.

Figure 9:
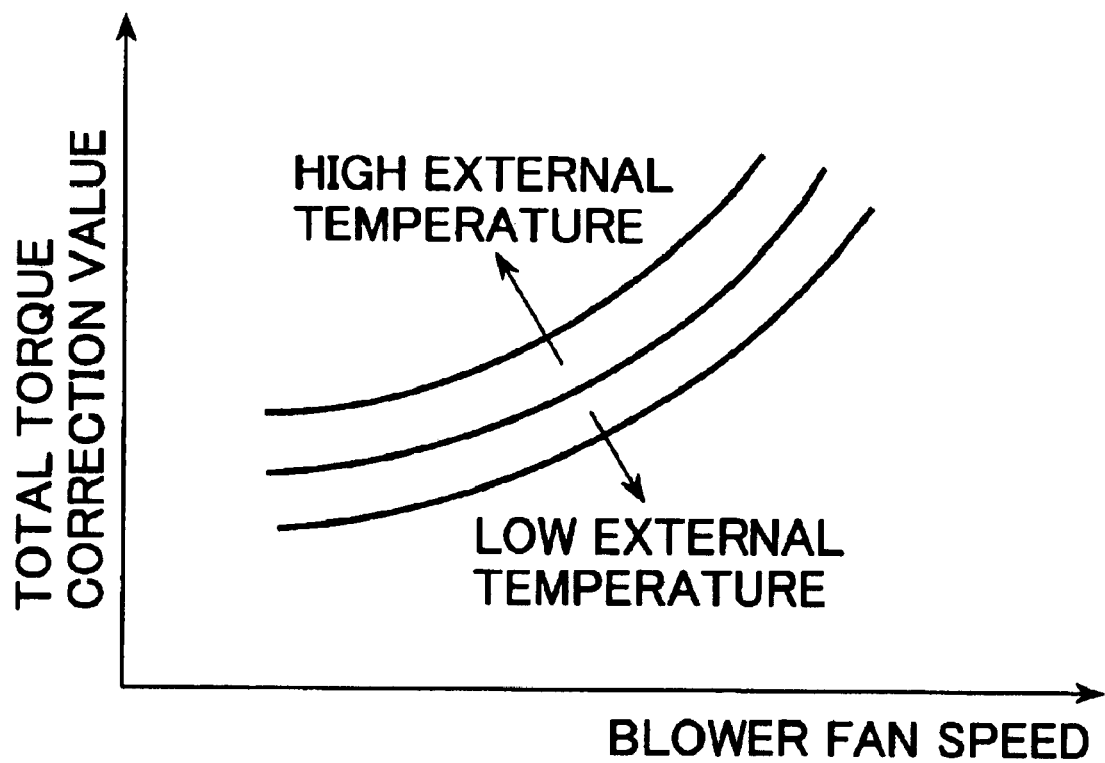
FIG. 9 is a map for correction of the total torque.

In the next step 117, a corrected total torque T1' is calculated by performing correction on the total torque T1 of the alternator and the compressor together, as calculated in the step 114, using a total torque correction value taken from the correction map shown in FIG. 9, based upon the external temperature and the rotational speed of the blower fan.

In the correction map of FIG. 9, the correction value is set so that the total torque T1 becomes higher when the external temperature becomes higher, or when the rotational speed of the blower fan becomes higher. This is because, when the external temperature or the rotational speed of the blower fan becomes higher than the conditions when the target refrigerant pressure was set in the step 110, the required torque becomes greater to this extent, since it is necessary to perform more cooling due to this factor. Furthermore, since it is necessary to generate more electric current for the blower fan when the rotational speed of the blower fan becomes greater, the required torque also becomes greater to this extent.

In the next step 118 a second target value D2 for the duty ratio for the motor fan is obtained, so as to make the corrected total torque T1' of the torque of the alternator and the torque of the compressor together to be a minimum, in consideration of the operational states of the alternator and of the compressor. In concrete terms, the duty ratio of the motor fan is changed by a little bit at a time from the first target value D1, and, after having calculated the electric current I2 to be generated by the alternator in the same manner as in the step 111 described above, the torque Ti2 of the alternator is calculated in the same manner as in the step 112, and the torque Tc2 of the compressor is calculated in the same manner as in the step 113 described above.

Finally, the total T2 of Ti2 and Tc2 is calculated and the duty ratio of the motor fan when T2 is less than T1' is obtained, and this procedure is repeated, and the duty ratio when T2 attains its minimum is taken as the second duty ratio target value D2.

And, after calculating this second target value D2, the target refrigerant pressure for the compressor which is considered ideal is obtained using the map shown in FIG. 5.

In the step 119, the magnitudes of the first target value D1 and the second target value D2 are compared together. And if the second target value D2 is greater than or equal to the first target value D1 then the flow of control proceeds to the next step 120, while if the second target value D2 is less than the first target value D1 then the flow of control is transferred to the step 121.

In the step 120, the motor fan is controlled with a duty ratio equal to the second duty ratio target value D2. In this case, the torque load imposed upon the engine becomes a minimum, and moreover the operational states of the alternator and the compressor are optimized, since a duty ratio for the motor fan (in other words D2) is used which does not exert any influence upon the performance of the air conditioner.

On the other hand, in the step 121, the motor fan is controlled with a duty ratio equal to the second duty ratio target value D1.

In the next step 122, the value of the refrigerant pressure of the compressor is read in from the discharge pressure sensor 95.

In the next step 123, the deviation is obtained between the target refrigerant pressure which was obtained in the step 110 or the step 118, and the refrigerant pressure which has been detected.

In the next step 124, the duty ratio D of the motor fan is corrected so as to cancel this deviation.

On the other hand, if in the check in the step 102 it is determined that the air conditioner switch SW is OFF, then the flow of control is transferred to the step 125 of the FIG. 2 flowchart, and the detected value of the coolant temperature is read in, in the same manner as in the step 104.

In the next step 126, the second command value Y is calculated from the coolant temperature which was read in in the step 125, in the same manner as in the step 106.

In the next step 127, the second command value Y is taken as being the first target value D1. Here, since the air conditioner switch SW is OFF, the second target value D2 in consideration of the operational state of the compressor is not calculated.

In the next step 128, the target refrigerant pressure of the compressor is calculated corresponding to the first target value D1, from the map of FIG. 5. And, after controlling the motor fan based upon the duty ratio of the first target value D1 in the step 121, and after correction on the duty ratio thereafter has been performed, the flow of control returns, and the above describe control procedure is repeated.

With this preferred embodiment of the present invention constituted as described above, since the total torque of the alternator and the compressor is brought to the minimum while satisfying the requirements for engine coolant temperature and for air conditioner performance, accordingly the value of the load upon the engine is reduced, so that it is possible to anticipate an improvement in fuel economy (fuel efficiency). In particular, in the calculation of the second target value, since the total torque of the alternator and the compressor is corrected based upon the external temperature and upon the rotational speed of the blower fan, accordingly, even if the external temperature or the cooling requirement of the cooling unit within the vehicle passenger compartment changes, the engine can drive the alternator and the compressor with the minimum torque, so that it becomes possible to enhance the fuel economy of the vehicle without experiencing any influence from the cooling requirement within the vehicle passenger compartment.

Furthermore, when calculating the target refrigerant pressure for the compressor in correspondence to the first and the second target values for duty ratio which have been calculated and controlling the motor fan, it becomes possible for the compressor to operate in the ideal state, since, if deviation has occurred between the actual refrigerant pressure and the target refrigerant pressure, the duty ratio is corrected so as to make the actual refrigerant pressure approach towards the target refrigerant pressure.

Although, in the above described preferred embodiment, the explanation was made in terms of an example in which a second target value D2 for the duty ratio for the motor fan was obtained so that the corrected total torque T1' of the torque of the alternator and the torque of the compressor became a minimum, the present invention is not to be considered as being necessarily limited by this detail. It would be acceptable to employ a duty ratio which is a value greater than the first target value D1, and which corresponds to a total torque which is merely smaller than the total torque of the torque of the alternator and the torque of the compressor corresponding to the first target value D1. In this case as well, it is possible to enhance the fuel economy of the vehicle.

Second Embodiment

In the following, the second embodiment of the present invention will be explained based upon the figures.

Figure 10:
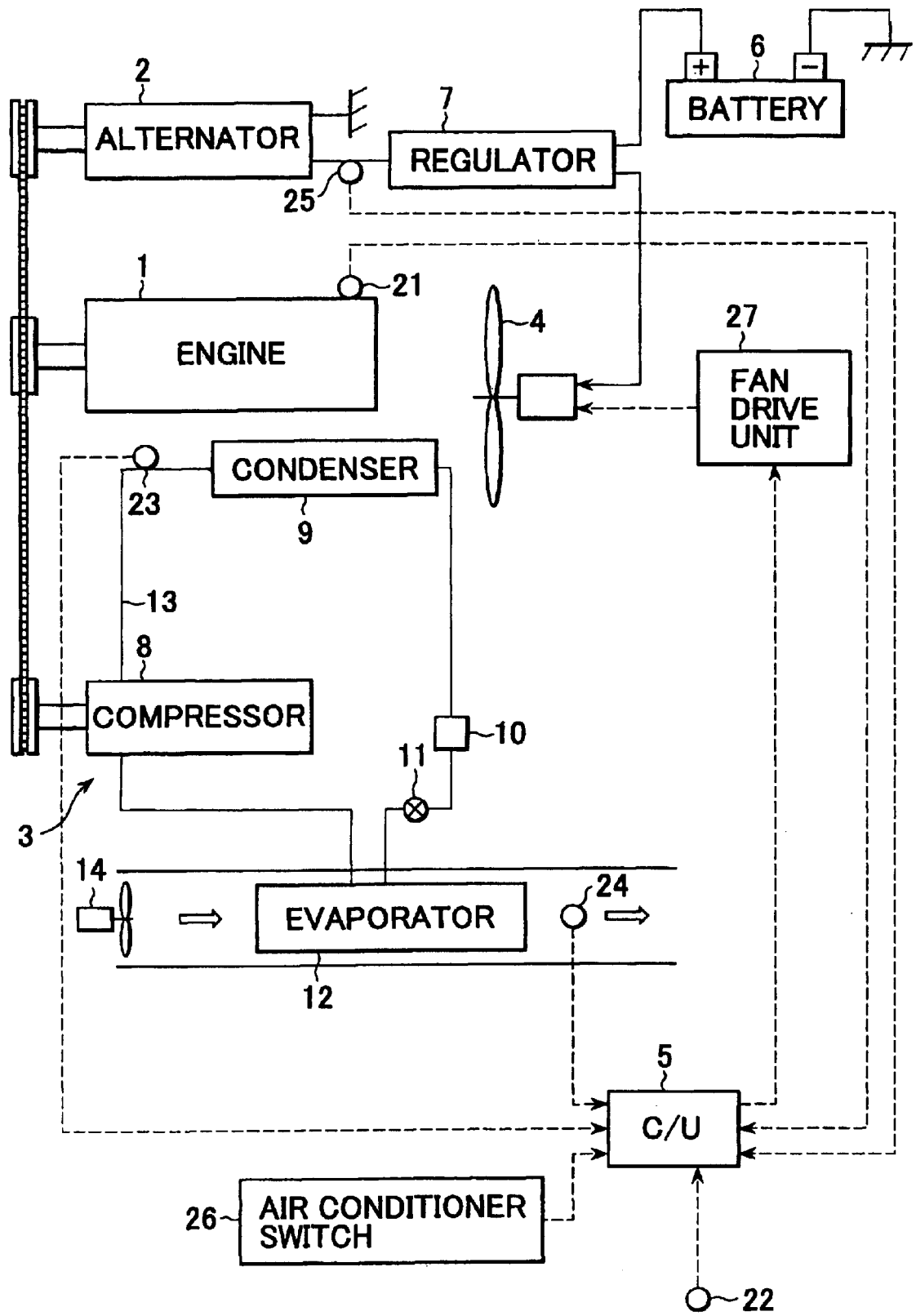
FIG. 10 is a structural system figure showing the control device for a cooling fan of a vehicle according to an embodiment of the present invention.

FIG. 10 is an overall structural system figure showing the control device for a cooling fan according to an embodiment of the present invention. As shown in FIG. 10, this cooling fan control device comprises an engine 1, an alternator (generator) 2, an air conditioning device (air conditioner) 3, an electrically driven cooling fan 4, and a control unit (C/U) 5.

The heat which is generated by the engine 1 is absorbed by engine cooling water which passes through a water jacket, and then this heat which has been absorbed is radiated via a radiator (not shown in the figures).

The alternator 2 is mechanically connected to an output shaft of the engine 1, and is driven by the drive power of the engine 1 and generates electricity. This alternator 2, the electrically driven cooling fan 4, and a battery 6 are electrically connected together via a regulator 7. And the electrically driven cooling fan 4 is operated by the electrical power which is generated by the alternator 2 being supplied to the electrically driven cooling fan 4 via the regulator 7.

The air conditioner 3 comprises a compressor 8 which is mechanically connected to the output shaft of the engine 1 and which is driven by the drive power of the engine 1 so as to suck in refrigerant, compress it, and discharge it at high temperature and high pressure, a condenser 9 which cools and liquefies the refrigerant which has been discharged from this compressor 8, a receiver/drier 10 which temporally accumulates the refrigerant which has been liquefied by this condenser 9, an expansion valve 11 which sprays out the refrigerant which has been liquefied as a mist and evaporates it, and an evaporator 12 which is cooled by passage of this evaporated refrigerant; and these are connected together by a refrigerant conduit 13. And a cooling air flow is created by a draft being passed through the evaporator by a blower fan 14. It should be understood that an electromagnetic clutch (not shown in the figure) is connected to the compressor 8, and thereby it is arranged to enable transmission or interruption of drive power from the engine 1.

The electrically driven cooling fan 4 is operated by receiving supply of electrical power, and sends a cooling air flow (for heat transfer) to the condenser 9. By doing this the engine performance is maintained and over heating is avoided, and the heat dissipation performance of the condenser 9 is elevated so that the performance of the air conditioner is maintained.

To the control unit (C/U) 5 there are inputted detection signals from various detection sensors such as a water temperature sensor 21 which detects the temperature of the cooling water of the engine, an external air temperature sensor 22 which detects the external air temperature, a discharge pressure sensor 23 which detects the pressure of the refrigerant which is discharged from the compressor 8 (its discharge pressure), an after-evaporator draft temperature sensor 24 which detects the temperature of the air flow which passes through the evaporator 12 (the after-evaporator draft temperature), and an electric current sensor 25 which detects the electric current from the alternator 2, and the like, and signals (ON/OFF, and required cooling performance) from an air conditioner switch 26.

And the control unit (C/U) 5 performs a predetermined calculation procedure based upon the detection signals which are input from the various detection sensors, and thereby executes engine control such as fuel injection control and the like. Furthermore, in order to obtain the cooling performance which is required by the air conditioner switch 26, the control unit (C/U) 5 performs engagement and disengagement of the electromagnetic clutch according to the external air temperature, the after-evaporator draft temperature, and the like, so as to drive or to stop the compressor 8 (i.e. to execute control of the air conditioner 3).

Moreover, the control unit (C/U) 5 performs variable control of the electrically driven cooling fan 4 via a fan drive unit, according to the operational state of the air conditioner 3 and the external air temperature.

Here, the control of the electrically driven cooling fan which is executed by the control unit (C/U) 5 in this embodiment will be explained in detail.

In this control, first, when operating the air conditioner 3, a target discharge pressure for the compressor 8 is set, and an operating duty ratio for the electrically driven cooling fan 4 is set so as to maintain the discharge pressure at this target discharge pressure (hereinafter this will be termed "the operating duty ratio for this discharge pressure"). The target discharge pressure which is set here is the most appropriate discharge pressure which will make the total of the drive load of the compressor 8 forth is required cooling performance and the drive load of the electrically driven cooling fan 4 for cooling the condenser 9 (in other words, the total load) to be a minimum; and, in concrete terms, it is set in the following manner.

In other words, since the compressor 8 is driven by the output of the engine 1, the drive power for driving the compressor 8 (the compressor drive power) constitutes a load upon the engine 1. And it is possible to convert the compressor discharge pressure (the compressor drive power) into the drive load of the compressor 8, since this compressor drive power is given by the discharge pressure minus the intake pressure (which is constant).

Furthermore, since the electrically driven cooling fan 4 is operated by the electrical power from the alternator 2, and this alternator 2 is driven by the output of the engine 1 to generate electricity, accordingly it is possible to obtain the drive power for driving the alternator 2, in other words the load upon the engine 1, from the electrical power which is consumed by the electrically driven cooling fan 4 (for example, from the integrated value of the electric current which is detected by the electric current sensor 25); and, due to this, it is possible to convert the electrical power which is consumed by the electrically driven cooling fan 4 into the drive load of the alternator 2 for obtaining the electrical power for operating the electrically driven cooling fan 4.

On the other hand, when the condenser 9 of the air conditioner 3 is cooled by the electrically driven cooling fan 4, the condensation temperature of the refrigerant in this condenser 9, in other words the condensation pressure, drops. As a result, the discharge pressure of the compressor drops, and the drive load of the compressor 8 is reduced.

By the above, in the cooling performance which is required from the air conditioner 3, when, by varying the operating duty ratio of the electrically driven cooling fan 4 (the fan operational duty ratio), its amount of air flow, in other words the cooling effect of the condenser 9, is increased, then the drive load of the compressor 8 (its discharge pressure) is reduced, while the drive load of the alternator 2 (the consumption of electrical power by the electrically driven cooling fan 4) is increased. Accordingly, by varying the fan operational duty ratio, it is possible to find the operational point (the most suitable point) at which the total of the drive load of the compressor and the drive load of the alternator (in other words the operational load of the electrically driven cooling fan) becomes a minimum. And by operating at this most suitable point, in other words by controlling the fan operational duty ratio so as to keep (so as to maintain) the compressor discharge pressure at this time (i.e. the target discharge pressure), it becomes possible to keep the engine load which accompanies operation of the air conditioner 3 at the minimum limit, and accordingly it is possible to anticipate an improvement of fuel economy.

Figure 11A:
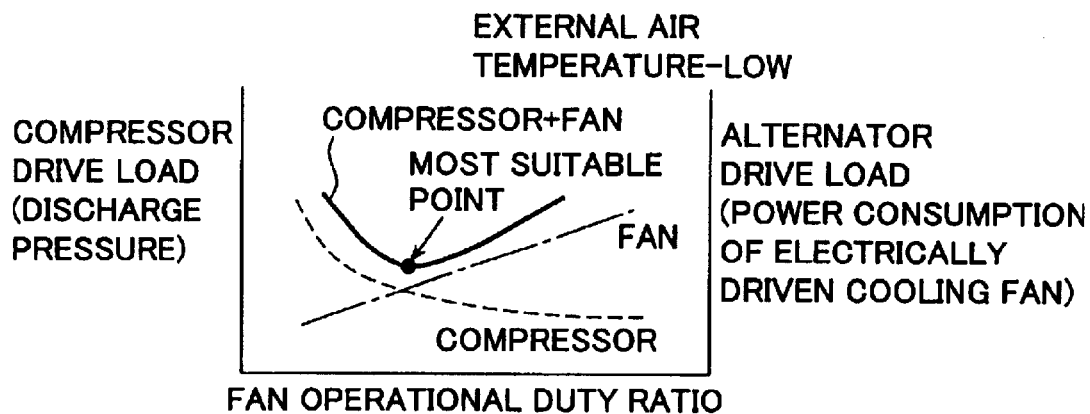
FIGS. 11A–11C are figures showing compressor drive load (discharge pressure) and alternator drive load (consumption of electrical power by an electrically driven cooling fan) with respect to fan operation duty ratio.
Figure 11B:
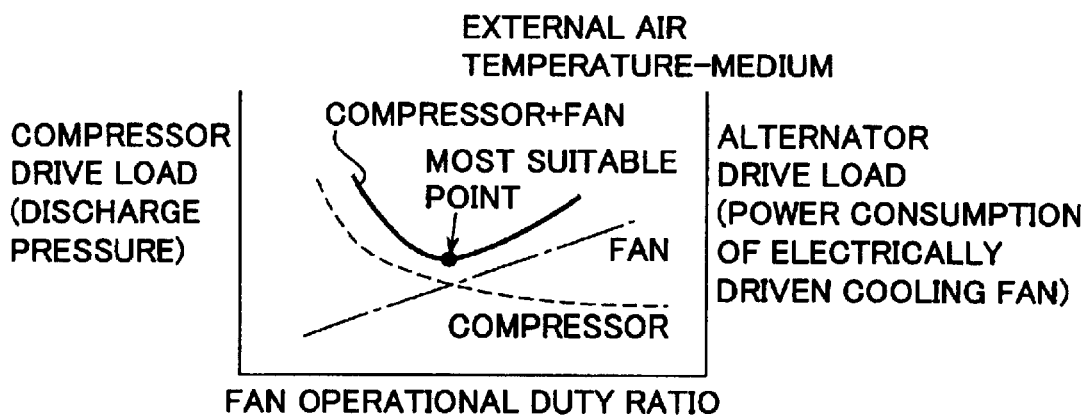
Figure 11C:
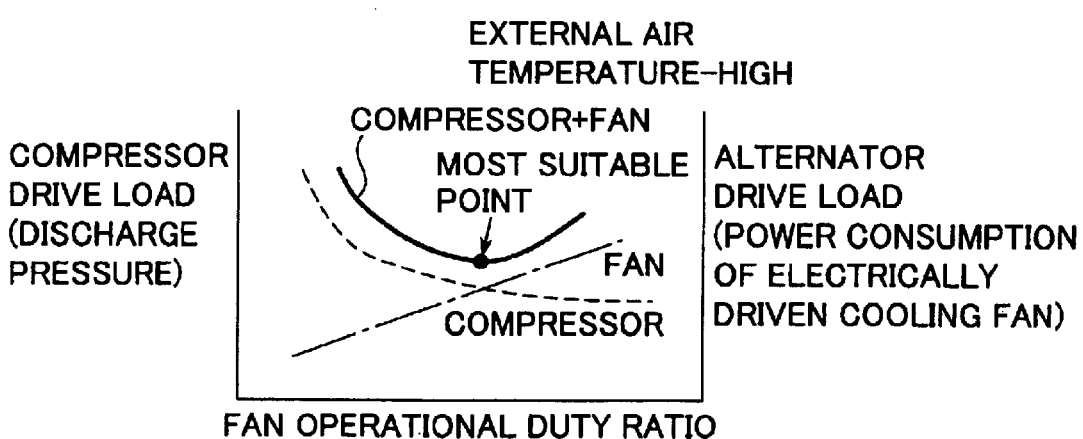
Figure 12:
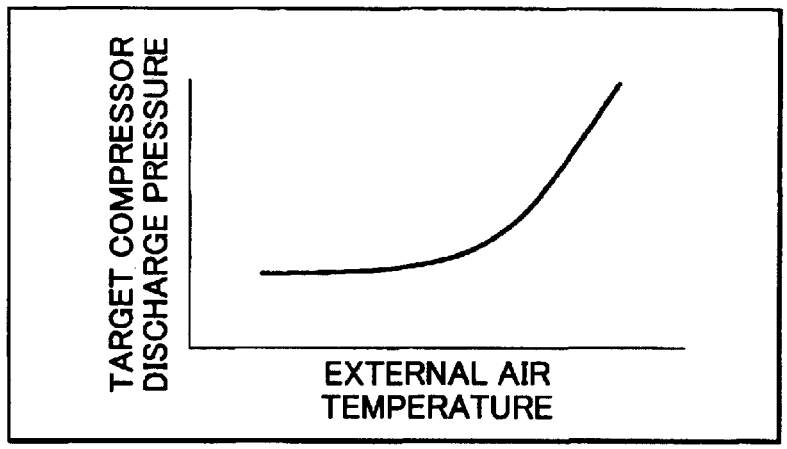
FIG. 12 is a figure showing an example of a target discharge pressure map.

FIGS. 11A–11C show the above described relationship and most suitable point; and FIGS. 11A through 11C respectively show the cases in which the external air temperature is low, medium, and high. It should be understood that, in FIGS. 11A–11C, the broken line shows the drive load of the compressor 8, the single dotted line shows the drive load of the alternator 2 for operating the electrically driven cooling fan 4, and the solid line shows the total of these loads. And the most suitable point is obtained for each external air temperature, a target discharge pressure map (FIG. 12) is constructed and stored by taking the most suitable compressor discharge pressure according to the external air temperature, and the target discharge pressure is set by referring to this map. By this means, since the target discharge pressure is set without providing a plurality of maps, the control parameter does not change due to switching of maps. Accordingly, it is possible to ensure a stabilized fan operating characteristic, since the target discharge pressure which is set changes continuously according to change of the cooling performance which is demanded from the air conditioning device. Furthermore, since a plurality of map are not provided, the capacity of memory can be reduced.

Figure 13:
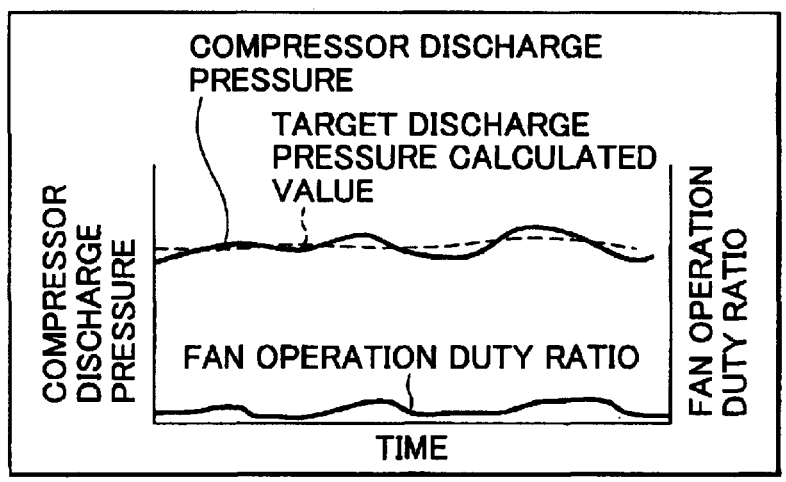
FIG. 13 is a figure showing the behavior of fan operation duty ratio and compressor discharge pressure when an air conditioner is being operated.

Accordingly, if the discharge pressure which has been detected by the discharge pressure sensor 23 is higher than the target discharge pressure, then the "operational duty ratio according to discharge pressure" is set in the direction to increase the current operational duty ratio, while, if it is lower than the target discharge pressure, then the "operational duty ratio according to discharge pressure" is set in the direction to decrease the current operational duty ratio. It should be understood that examples of the behavior of the fan operational duty ratio and the compressor discharge pressure when the air conditioner 3 is being operated are shown in FIG. 13.

Figure 14:
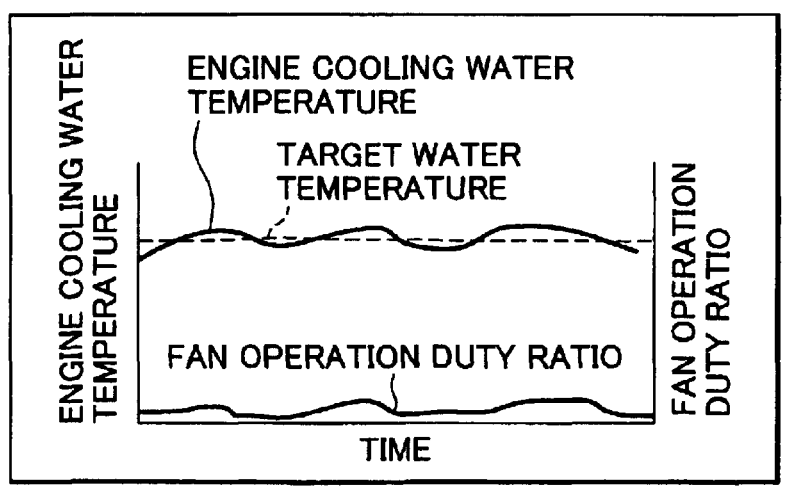
FIG. 14 is a figure showing the behavior of fan operation duty ratio and engine cooling water temperature when the air conditioner is stopped.

Next, the operational duty ratio of the electrically driven cooling fan 4 is set so that the engine cooling water temperature maintains a target engine cooling water temperature (in the following this will be termed the "operational duty ratio according to water temperature"). It should be understood that this target engine cooling water temperature is set in advance according to the characteristics of the vehicle and the engine and so on, and is stored in memoru. Accordingly, as shown in FIG. 14, if the engine cooling water temperature which has been detected by the water temperature sensor 21 is higher than the target engine cooling water temperature, then the "operational duty ratio according to water temperature" is set in the direction to increase the current operational duty ratio, while, if it is lower than the target engine cooling water temperature, then the "operational duty ratio according to water temperature" is set in the direction to decrease the current operational duty ratio. It should be understood that examples of the behavior of the fan operational duty ratio and the engine cooling water temperature when the air conditioner 3 is stopped are shown in FIG. 14.

And the "operational duty ratio according to discharge pressure" and the "operational duty ratio according to water temperature" are compared together, and the one whose demand value is the higher is taken as the final operational duty ratio, and this is outputted to operate the electrically driven cooling fan 4. It should be understood that, when the air conditioner 3 is stopped, the "operational duty ratio according to water temperature" is set as the final operational duty ratio.

Figure 15:
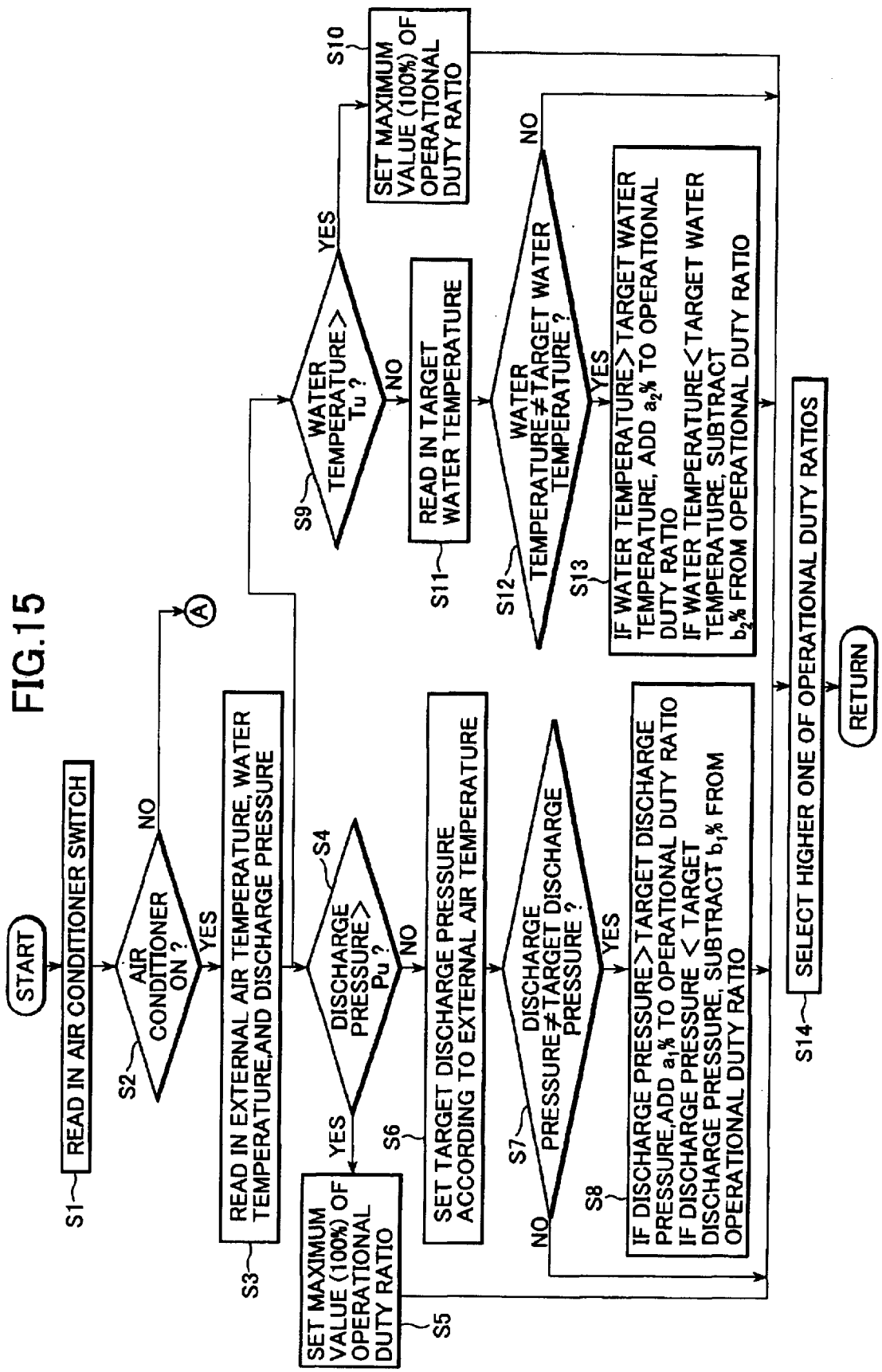
Figure 16:
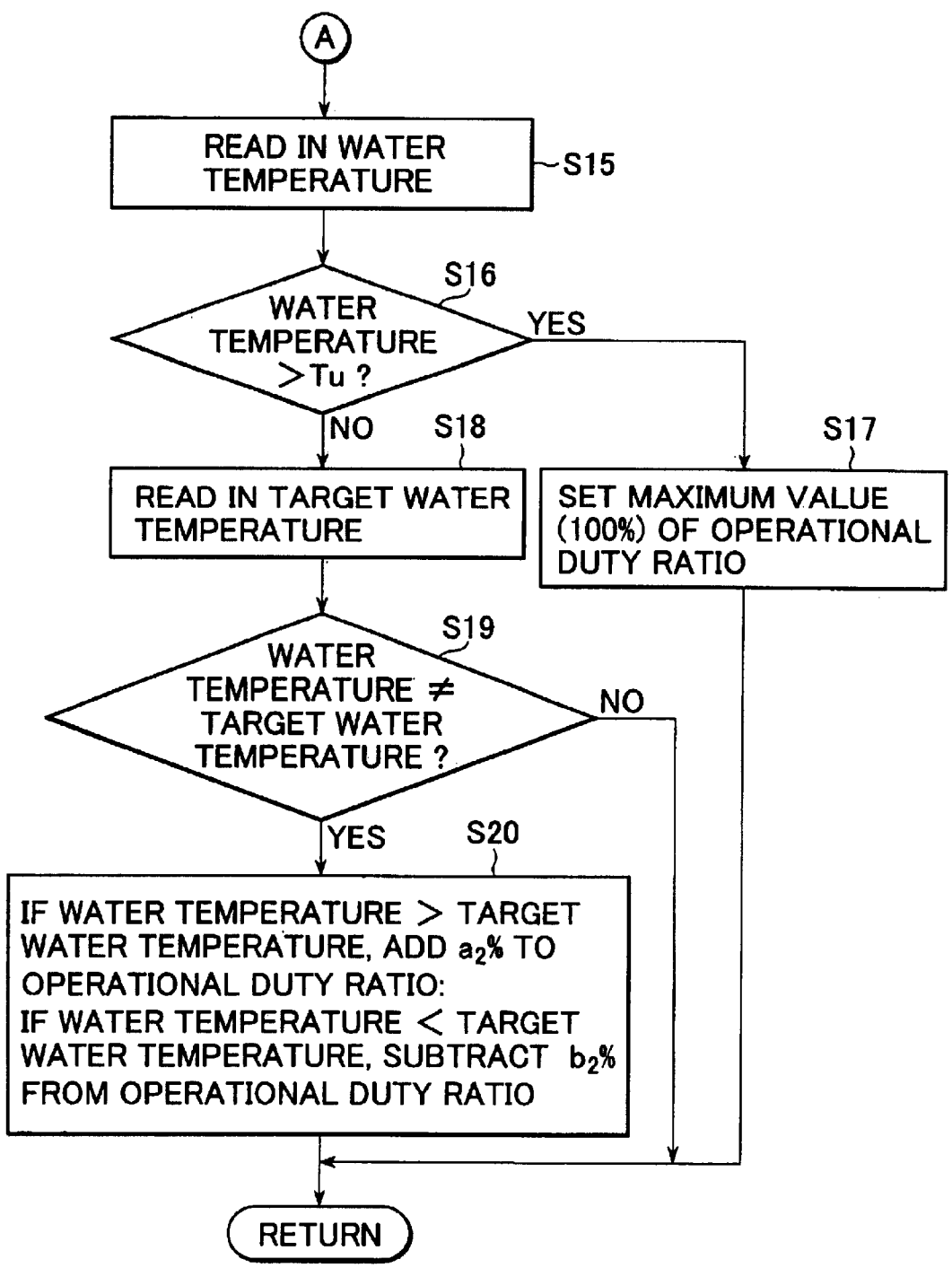
FIG. 16 is a flow chart showing the details of control of the electrically driven cooling fan when the air conditioner is OFF.

FIGS. 15 and 16 are flow charts for the electrically driven cooling fan control which has been explained above, and they are executed repeatedly at a predetermined time interval. In FIG. 15, in the step 1 (S1 in the figure, and the same henceforward), the state of the air conditioner switch 27 is read in. In the step 2, a decision is made as to whether or not the air conditioner 3 is being operated (the switch 27 is ON) or is stopped (the switch 27 is OFF). And, if the air conditioner is being operated, the flow of control proceeds to the step 3.

In the step 3, the engine cooling water temperature is read in from the water temperature sensor 21, the external air temperature is read in from the external air temperature sensor 22, and the discharge pressure is read in from the discharge pressure sensor 23. And in the steps 4 through 8 the "operational duty ratio according to discharge pressure" is set, while in the steps 9 through 13 the "operational duty ratio according to water temperature" is set.

In the step 4, a decision is made as to whether or not the discharge pressure which has been read in is greater than a predetermined pressure Pu. This decision is one which is performed, for example, in order to protect the compressor 8, and from that point of view an upper limit pressure is set as the predetermined pressure. And, if the discharge pressure is greater than the predetermined pressure Pu, the flow of control proceeds to the step 5, and the maximum value (duty ratio 100%) is set as an "operational duty ratio according to discharge pressure" during emergency, and the flow of control proceeds to the step 14. By doing this, the electrically driven cooling fan 4 comes to cool the air conditioner 3 (the condenser 9) with its maximum air flow amount (so that the maximum cooling effect is obtained). On the other hand, if the discharge pressure is less than the predetermined pressure Pu, then the flow of control proceeds to the step 6.

In the step 6, the target discharge pressure is set according to the external air temperature, by referring to a map like that shown in FIG. 13.

In the step 7, the discharge pressure which has been read in and the target discharge pressure which has been set are compared together. And if the discharge pressure is different from the target discharge pressure the flow of control proceeds to the step 8, while if the discharge pressure and the target discharge pressure are in agreement then the flow of control proceeds straight to the step 14.

In the step 8, the normal "operational duty ratio according to discharge pressure" is set. In concrete terms, if the discharge pressure which has been read in is greater than the target discharge pressure, then a predetermined duty ratio (for example, $a_1\%$) is added to the current operational duty ratio, while, if the discharge pressure which has been read in is less than the target discharge pressure, then a predetermined duty ratio (for example, $b_1\%$) is subtracted from the current operational duty ratio.

In the step 9, a decision is made as to whether or not the engine cooling water temperature which has been read in is greater than a predetermined temperature Tu. This decision is one which is performed, for example, in order to avoid overheating and maintain engine performance, and from that point of view an upper limit temperature is set as the predetermined temperature. And, if the engine cooling water temperature is greater than the predetermined temperature Tu, the flow of control proceeds to the step 10, and the maximum value (duty ratio 100%) is set as an "operational duty ratio according to water temperature" during emergency, and the flow of control proceeds to the step 14. By doing this, the electrically driven cooling fan 4 comes to cool (the radiator of) the engine 1 with its maximum air flow amount (so that the maximum cooling effect is obtained). On the other hand, if the engine cooling water temperature is less than the predetermined temperature Tu, then the flow of control proceeds to the step 11.

In the step 11, the target engine cooling water temperature which has been stored is read in.

In the step 12, the engine cooling water temperature which has been read in and the target engine cooling water temperature are compared together. And if the engine cooling water temperature is different from the target cooling water temperature the flow of control proceeds to the step 13, while if the engine cooling water temperature and the target engine cooling water temperature are in agreement then the flow of control proceeds straight to the step 14.

In the step 13, the normal "operational duty ratio according to water temperature" is set. In concrete terms, if the engine cooling water temperature which has been read in is greater than the target engine cooling water temperature, then a predetermined duty ratio (for example, $a_2\%$) is added to the current operational duty ratio, while, if the engine cooling water temperature which has been read in is less than the target engine cooling water temperature, then a predetermined duty ratio (for example, $b_2\%$) is subtracted from the current operational duty ratio.

And, in the step 14, the "operational duty ratio according to discharge pressure" and the "operational duty ratio according to water temperature" are compared together, and the larger one of these duty ratios is selected as the operational duty ratio for the electrically driven cooling fan 4. On the other hand, if in the step 2 the air conditioner 3 is stopped, then the flow of control proceeds to the step 15 of FIG. 16, and the engine cooling water temperature is read in from the water temperature sensor 21. And, in the steps 16 through 20, the "operational duty ratio according to water temperature" is set in the same manner as in the steps 9 through 13, and this is taken as the operational duty ratio for the electrically driven cooling fan 4.

Moreover, although the compressor 8 of this second embodiment is one of an ON/OFF type which is switched over between being driven and being stopped, in addition to this, it would also be possible for it to be of a type whose discharge capacity could be varied.

With the second embodiment described above, beneficial effects are obtained as described below.

(1) When for example the temperature around the vehicle (for example, the external air temperature) increases, the load of the compressor is also increased, since this entails increase of the heat load upon the evaporator 12 and reduction of the heat dissipation performance of the condenser 9. Thus, in the above described embodiment, it is possible to set with good accuracy the target discharge pressure in correspondence to the drive load of the compressor 8 which changes according to the external temperature, since the target discharge amount is set according to the external air temperature.

(2) Since the electrically driven cooling fan 4 is controlled either according to the "operational duty ratio according to discharge pressure" or according to the "operational duty ratio according to water temperature", in other words, either according to the compressor discharge pressure or according to the cooling water temperature, whose rates of change are comparatively gentle, accordingly the fan operation characteristic (state) is stabilized.

(3) Since, when operating the air conditioner, the "operational duty ratio according to discharge pressure" and the "operational duty ratio according to water temperature" are compared together, and the electrically driven cooling fan 4 is controlled according to the one of these whose demand value is the higher, accordingly it is possible to operate the electrically driven cooling fan 4 in the most appropriate manner and to ensure the required amount of air flow.

(4) Since, when operating the air conditioner, the electrically driven cooling fan 4 is operated at its maximum control amount (i.e. its operational duty ratio is 100%) when the compressor discharge pressure as detected by the discharge pressure sensor 23 is above the predetermined pressure Pu, accordingly the maximum fan cooling effect is ensured, and it is possible to protect the compressor 8 from abnormal increase of discharge pressure (i.e. it is possible to prevent increase of load of the compressor 8 and deterioration of its performance).

(5) Since the electrically driven cooling fan 4 is operated at its maximum control amount (i.e. its operational duty ratio is 100%) when the engine cooling water temperature as detected by the water temperature sensor 21 is above the predetermined temperature Tu, accordingly the maximum fan cooling effect is ensured, and it is possible to prevent excessive increase of the temperature of the engine (i.e. it is possible to prevent overheating).

The above described embodiment is given by way of example, and various modifications can be made without departing from the spirit and scope of the invention.

The disclosure of the following priority application is herein incorporated by reference:

Japanese Patent Application No.2002-184709, filed Jun. 25, 2002.

Japanese Patent Application No. 2002-254431, filed Aug. 30, 2002.

What is claimed is:

1. A control device for a motor fan of a vehicle, which controls the motor fan to cool a radiator for engine coolant and a condenser for air conditioner refrigerant, comprising:
   a first command value calculation section which calculates a first command value for control of the motor fan according to refrigerant pressure;
   a second command value calculation section which calculates a second command value for control of the motor fan according to coolant temperature;
   a first target value setting section which sets the greater of the first command value and the second command value as a first target value;
   a second target value setting section which obtains a second target value for control of the motor fan which corresponds to a total torque which is smaller than a total torque of a torque of an alternator and a torque of a compressor corresponding to the first target value; and
   a control section which controls the motor fan according to the second target value, wherein
      the second target value setting section corrects the total torque of the torque of the alternator and the torque of the compressor based upon a predetermined condition when obtaining the total torque of the torque of the alternator and the torque of the compressor.

2. A control device for a motor fan of a vehicle according to claim 1, wherein the second target value setting section corrects the total torque of the torque of the alternator and the torque of the compressor, based upon a rotational speed of a blower fan motor.

3. A control device for a motor fan of a vehicle according to claim 1, wherein the second target value setting section corrects the total torque of the torque of the alternator and the torque of the compressor, based upon a rotational speed of a blower fan motor and an external temperature.

4. A control device for a motor fan of a vehicle according to claim 1, wherein the second target value setting section sets the second target value with a command value for control of the motor fan which is greater than the first target value and corresponds to a minimum value of the total torque of the torque of the alternator and the torque of the compressor.

5. A control device for a motor fan of a vehicle according to claim 1, wherein:
   the second target value setting section obtains a target refrigerant pressure in correspondence to the second target value and further corrects the second target value so as to bring the refrigerant pressure of the air conditioner towards the obtained target refrigerant pressure after the control section has controlled the motor fan according to the second target value.; and
   the control section further controls the motor fan according to the second target value which has been further corrected.

6. A control device for a motor fan of a vehicle, which controls a motor fan by duty ratio control to cool a radiator for engine coolant and a condenser for air conditioner refrigerant, comprising:
   a first command value calculation section which calculates a first command value of duty ratio according to refrigerant pressure;

a second command value calculation section which calculates a second command value of duty ratio according to coolant temperature;

a first target value setting section which sets the greater of the first command value and the second command value as a first target value of duty ratio;

a second target value setting section which calculates a total torque of a torque of an alternator and a torque of a compressor, and sets a duty ratio for which the total torque becomes a minimum as a second target value; and a duty ratio determination section which sets the greater of the first target value and the second target value as a final duty ratio, wherein the second target value setting section corrects the calculated total torque of the torque of the alternator and the torque of the compressor based upon a rotational speed of a blower fan motor, and sets a duty ratio for which the corrected total torque becomes minimum as the second target value.

7. A control device for a motor fan of a vehicle according to claim 6, wherein the second target value setting section corrects the total torque based upon the rotational speed of the blower fan motor and an external temperature.

8. A control device for a motor fan of a vehicle according to claim 6, further comprising:

a duty ratio control section which controls the duty ratio, wherein the duty ratio control section controls the final duty ratio which has been determined so as to bring the refrigerant pressure of the air conditioner towards a target refrigerant pressure.

9. A control device for a motor fan of a vehicle, comprising:

an engine;

an alternator which is driven by the engine;

an air conditioning device of which a compressor is driven by the engine;

an electrically driven motor fan which is operated by receiving supply of electrical power generated by the alternator, and which cools the air conditioning device;

a discharge pressure detection section which detects a discharge pressure of the compressor;

a target discharge pressure setting section which sets a target discharge pressure of the compressor with respect to a cooling performance which is required from the air conditioning device, so that a total of a drive load of the compressor and a drive load of the alternator for obtaining electrical power for operating the electrically driven motor fan becomes a minimum; and a motor fan control section which controls an operation of the electrically driven motor fan so that the discharge pressure of the compressor becomes equal to the target discharge pressure.

10. A control device for a motor fan of a vehicle according to claim 9, wherein the target discharge pressure is set according to a representative temperature in a neighborhood of the vehicle.

11. A control device for a motor fan of a vehicle according to claim 10, further comprising:

an external air temperature detection section which detects an external air temperature, wherein the representative temperature is the external air temperature which is detected by the external air temperature detection means.

12. A control device for a motor fan of a vehicle according to claim 9, wherein:

the electrically driven motor fan cools both the engine and the air conditioning device; and the motor fan control section operates the electrically driven motor fan according to the greater of a control amount which is set so that the discharge pressure of the compressor becomes equal to the target discharge pressure, and a control amount which is set so that an engine cooling water temperature becomes equal to a target engine cooling water temperature which has been set in advance.

13. A control device for a motor fan of a vehicle according to claim 9, wherein the motor fan control section operates the electrically driven motor fan at its maximum control amount, when the discharge pressure of the compressor exceeds a predetermined value.

14. A control device for a motor fan of a vehicle according to claim 9, further comprising:

an engine cooling water temperature detecting section which detects an engine cooling water temperature, wherein the motor fan control section operates the electrically driven motor fan at its maximum control amount, when the engine cooling water temperature exceeds a predetermined value.

15. A control method for a motor fan of a vehicle, which controls the motor fan to cool a radiator for engine coolant and a condenser for air conditioner refrigerant, comprising:

calculating a first command value for control of the motor fan according to refrigerant pressure;

calculating a second command value for control of the motor fan according to coolant temperature;

setting the greater of the first command value and the second command value as a first target value;

obtaining a second target value for control of the motor fan which corresponds to a total torque which is smaller than a total torque of a torque of an alternator and a torque of a compressor corresponding to the first target value; and controlling the motor fan according to the second target value, wherein the total torque of the torque of the alternator and the torque of the compressor is corrected based upon a predetermined condition when obtaining the total torque of the torque of the alternator and the torque of the compressor.

16. A control method for a motor fan of a vehicle which controls the motor fan to cool an air conditioning device of which a compressor is driven by an engine, comprising:

detecting a discharge pressure of the compressor;

setting a target discharge pressure of the compressor with respect to a cooling performance which is required from the air conditioning device, so that a total of a drive load of the compressor and a drive load of an alternator for obtaining electrical power for operating the motor fan becomes a minimum; and controlling an operation of the motor fan so that the discharge pressure of the compressor becomes equal to the target discharge pressure.

17. A control device for a motor fan of a vehicle, which controls the motor fan to cool a radiator for engine coolant and a condenser for air conditioner refrigerant, comprising:

a first command value calculation means for calculating a first command value for control of the motor fan according to refrigerant pressure;

a second command value calculation means for calculating a second command value for control of the motor fan according to coolant temperature;

a first target value setting means for setting the greater of the first command value and the second command value as a first target value;

a second target value setting means for obtaining a second target value for control of the motor fan which corresponds to a total torque which is smaller than a total torque of a torque of an alternator and a torque of a compressor corresponding to the first target value; and a control means for controlling the motor fan according to the second target value, wherein the second target value setting means corrects the total torque of the torque of the alternator and the torque of the compressor based upon a predetermined condition when obtaining the total torque of the torque of the alternator and the torque of the compressor.

18. A control device for a motor fan of a vehicle, comprising:

an engine;

an alternator which is driven by the engine;

an air conditioning device of which a compressor is driven by the engine;

an electrically driven motor fan which is operated by receiving supply of electrical power generated by the alternator, and which cools the air conditioning device;

a discharge pressure detection means for detecting a discharge pressure of the compressor;

a target discharge pressure setting means for setting a target discharge pressure of the compressor with respect to a cooling performance which is required from the air conditioning device, so that a total of a drive load of the compressor and a drive load of the alternator for obtaining electrical power for operating the electrically driven motor fan becomes a minimum; and a motor fan control means for controlling an operation of the electrically driven motor fan so that the discharge pressure of the compressor becomes equal to the target discharge pressure.

* * * * *